Patented June 12, 1945

2,378,322

UNITED STATES PATENT OFFICE 2,378,322

METHOD OF MAKING POROUS INSULATING ARTICLES

Norman R. Peterson, Midland, Mich., assignor to The Dow Chemical Company, Midland, Mich., a corporation of Michigan No Drawing. Application March 30, 1942, Serial No. 436,740

6 Claims. (Cl. 18—55)

This invention relates to a method useful in the preparation of insulating shapes from porous insulating materials.

Exfoliated vermiculite, cork, wood fiber, etc., have been used extensively as insulating materials both in granular form and in the form of molded shapes. In preparing molded shapes therefrom, it has been the custom to use as binders such materials as plaster of Paris, cement, and soluble silicates. Such binders become brittle upon drying and usually leave the article friable and easily broken. The articles wherein these materials are used as binders are also heavy and cumbersome to handle. Casein adhesives have been used as binders, but, as is well known, casein is subject to fungous attack and is not entirely impervious to water. The use of fungicidal preservatives and/or water resistant casein adhesives has not entirely overcome these difficulties. Other binders such as Bakelite resin have also been suggetsed, but their use requires either baking of the formed article in the mold or allowing it to dry for an excessively long period. The use of resins of this type is thus not conducive to rapid and economical manufacture of insulating shapes.

It is an object of the present invention to provide a binder for porous insulating materials which is water- and fire-resistant and effective when used in minor amounts.

An additional object is to produce a shaped article consisting essentially of a porous insulating material, together with a minor proportion of a binder, which is relatively flexible, non-friable, light in weight, and resistant to water and fire.

An additional object is to provide an improved method of manufacturing insulating shapes from a porous insulating material and a flexible water-resistant binder whereby prolonged baking of the article in the mold or extended drying periods are avoided.

These and related objects are readily accomplished by treating a porous insulating material with an aqueous solution of a mixture of a cold-water-soluble cellulose ether and a water-soluble, heat-setting resin, forming the wet porous insulating material in the desired shape in a mold, warming the formed shape while in the mold to a temperautre sufficient to gel the cellulose ether, and heating the molded shape after removal from the mold whereby the water is driven off and the mixture of ether and resin is converted to a tough, insoluble, flexible bonding agent for the vermiculite.

Although any porous insulating material, such as cork, wood fiber, etc., may be used, the invention will be described with reference to exfoliated vermiculite.

The term "cold-water-soluble cellulose ether" as used herein refers to those cellulose ethers, such as methyl cellulose, ethyl cellulose, etc., which are soluble in cold water but insoluble in hot water. It is, of course, well known that solutions of such ethers in cold water are usually more easily prepared after first treating the ether with hot water and cooling it while still wet. Solutions of these ethers gel upon heating to form thickened solutions or stiff jelly-like masses depending upon the concentration and type of cellulose ether in the solution. Methyl cellulose of a type suitable for use in the present invention is described by Maasberg in U. S. Patent 2,160,782. Grades of ethyl cellulose which may be used are described by Bock in J. Ind. Eng. Chem. 29, 985 (1937) and by Traube in U. S. Patent 2,140,568. Although any cold-water-soluble cellulose ether may be used, the invention will, for the sake of convenience, be described with reference to methyl cellulose.

Water-soluble heat-setting resins which may be used include urea-formaldehyde resins and melamine-formaldehyde resins. The urea-formaldehyde resin may advantageously be modified with a polyhydric alcohol such as ethylene glycol. One resin of the modified urea-formaldehyde type which has been found particularly advantageous in practicing the present invention is that which may be made from 1 molecular proportion of urea, 1 to 5 molecular proportions of ethylene glycol and 3 molecular proportions of formaldehyde as described by Hodgins and Hovey in U. S. Patent No. 2,168,477. Reference is also made to the use of resins of this type to insolubilize water-soluble cellulose ethers as described by Bass and Upright in U. S. Patent No. 2,270,180.

Among the melamine resins which may be used in the present invention are any of those resinous condensation products of melamine (2.4.6-triamino-s-triazine) with aldehydes such as formaldehyde, which are heat-hardenable and soluble in water. A method of preparing one melamine-formaldehyde resin which has been found satisfactory for use in the present invention and typical in its behavior of all of the water-soluble, heat-hardenable melamine resins with which we are familiar, is given herewith.

1 mol of melamine is caused to condense with 35 per cent aqueous formaldehyde at a pH of approximately 8 in an aqueous medium containing 7 mols (a slight excess) of formaldehyde. The condensation is carried out at a temperature of 45° to 60° C. and at a pressure of about 100 millimeters absolute. The reduced pressure is maintained until about 70 to 80 per cent of the water, including that originally present and that formed during the reaction, has been removed. The resulting partly dehydrated mass has a viscosity of about 100 poises. This viscous product is then gradually heated at 90° C. during the course of about one hour and in the presence of slightly more than the theoretical 3 mols of diethylene glycol. The temperature is gradually raised to about 120° C. during the course of about 5 hours and the mixture held at this temperature at atmospheric pressure until the desired water-solubility of the melamine formaldehyde condensate is obtained. When this stage is reached, there remains in the reaction vessel about 810 grams of a solution about 50 per cent resin concentration for each gram molecular weight of melamine used. Representative batches of the above-described resin have had the following average properties:

| | |
|---|---|
| Viscosity (Gardner-Holdt at 25° C.) | W–X |
| Acid No. | 0.13 |
| Solvent Tolerances | |
|   Diethylene glycol } | |
|   Ethylene glycol } | infinite |
|   Water } | |
|   Methyl alcohol } | |
|   Monobutyl ether of } ---per cent-- | 300 |
|   diethylene glycol } | |
|   Ethyl alcohol ------------------do---- | 200 |
|   Mineral spirits | none |

Other water-soluble condensation products of melamine and/or urea with formaldehyde may be used. Examples of those commercially available are the products known to the trade as "Melantine Salt," "Cascamite Powdered Adhesive" and "Uformite CB-550." Other water-dispersible urea-formaldehyde resins used in the plywood laminating industry may also be used.

Although the proportion of water-soluble, heat-setting resin used in the aqueous solution with which the vermiculite is treated depends, among other factors, upon the particular resin used, other factors, upon the particular resin used, from 5 to 50 per cent, preferably from 10 to 20 per cent, by weight of resin based on the amount of methyl cellulose is advantageously used. In the case of a urea-formaldehyde of the type mentioned above, from 9 to 16 per cent by weight based on the amount of methyl cellulose may be used with particular advantage. Although larger or smaller proportions of the resin may be used, it may be mentioned that the use of either too small or too large a proportion of the resin tends to yield a binder in the finished article less resistant to water than when the preferred proportions are used. The use of too large a proportion of resin also tends to make the binder less flexible than is desirable for some purposes.

The solution containing the methyl cellulose and water-soluble, heat-setting resin may be prepared in any convenient manner such as by mixing separately prepared solutions of the ether and resin. The solution is usually prepared to contain from 2 to 6 per cent by weight of combined ether and resin. The vermiculite, usually in granular or powder form, and the solution of resin and ether are then mixed together thoroughly. The pH of the solution may advantageously be adjusted, e. g. by adding a mineral acid or an acid salt, to from 4 to 5, since the hardening of the ether-resin mixture during the subsequent baking operation is considerably accelerated thereby. Sufficient solution is used to yield a wet agglomerate containing from about 1 to about 5 per cent by weight of combined ether and resin based on the weight of the vermiculite. The composition and proportion of the solution used are usually adjusted so that the vermiculite is thoroughly wetted by the solution, but the wet agglomerate is of such a consistency that aqueous solution does not readily separate therefrom. The solution should contain sufficient of the particular type of methyl cellulose employed to yield a relatively thick solution thereby preventing undue penetration of the solution into the pores of the insulating material. It should also contain sufficient methyl cellulose to cause it to set to a stiff jelly-like mass when warmed. Mixing of the solution and the vermiculite is usually carried out at a temperature below that at which gelling of the solution due to the dehydration of the methyl cellulose occurs. Although the gelling temperature depends, among other factors, upon the grade of methyl cellulose used and the concentration thereof in the solution, it is usually within the range 60° to 100° C.

The wet agglomerate is placed in a mold of the desired shape and sufficient pressure is applied to cause the mass to assume the shape of the mold. The mass is then warmed in the mold to above the temperature at which gelling of the solution occurs, e. g. to from 60° to 100° C., whereby the molded mass is stiffened and develops sufficient structural strength to allow it to be removed from the mold without substantial deformation. The soft, molded mass is heated further to dry it after it is removed from the mold and finally baked to harden and insolubilize the methyl cellulose-resin mixture whereby the mixture is converted to a flexible, water-resistant composition which effectively binds the vermiculite particles together. Although the temperature and time of heating depend to some extent on the particular resin employed and the size and shape of the molded article, hardening of the binder usually occurs when the heating is carried out at from 90° to 150° C. Thus when the molded article contains a melamine-formaldehyde resin as the resin component, the drying and hardening steps may be accomplished by heating at 90° to 120° C. When the resin component is of the ureaformaldehyde type, the drying step may be carried out at a temperature somewhat above 100° C. and the dried shape then heated to from 140° to 150° C. Due to the excellent heat insulating quality of the molded article, the temperature in the center of thick shapes rises relatively slowly. Baking should be carried on sufficiently long, usually for from 2 to 12 hours, to insure uniform heating throughout the mass. The drying and baking operations are usually carried out at atmospheric pressure, although higher or lower pressures may be used, if desired. The baked shape is then allowed to cool and is found to be light in weight, not easily broken, water- and fire-resistant, and to have excellent sound and heat insulating qualities. Although drying and hardening of the binder are hastened by heating as just explained, it should be noted that the same result may be accomplished by allowing the molded mass to stand for several days after it has been warmed in the mold to stiffen it. It appears that this initial warming serves to initiate the hardening action which thereafter proceeds at ordinary temperatures, although much more slowly than at temperatures in the range 90° to 150° C. mentioned above.

It should be noted that the above described drying and heating steps may, due to the stiffening of the article in the mold upon warming, be carried out after the article has been removed from the mold. This affords a great saving in time and mold equipment over other conventional processes involving a baking operation since such baking operation has heretofore necessarily been carried out with the article still in the mold. Furthermore, particularly in the manufacture of shapes of uniform cross section, such as slabs, blocks, rods, tubes, etc., the wet agglomerate consisting of vermiculite and the solution of ether and resin may be extruded continuously through an extrusion machine adapted to warm the agglomerate during the extrusion operation and the stiffened shape issuing from the machine may be periodically severed into sections which may then be dried and baked in continuous manner, thus rendering the entire process continuous.

One mode of practicing the invention may be illustrated by the following specific example:

100 parts of a 4 per cent by weight aqueous solution of methyl cellulose, a 2 per cent solution of which in water had a viscosity of 1,500 centipoises at 20° C., was mixed with 100 parts of a 3 weight per cent aqueous solution of a melamine-formaldehyde resin known commercially as "Beckamine P-2," and phosphoric acid was added until the pH of the combined solutions was 4.5. This solution was then mixed thoroughly at about 25° C. with 100 parts by weight of exfoliated vermiculite. The agglomerate so formed was then pressed into a mold 2 x 12 x 18 inches in size, and the mold and contents then placed in an oven at 120° C. for 2 hours. Upon removing the mold from the oven and opening it, it was found that the mass was sufficiently coherent to allow its being removed from the mold without substantial deformation. The soft shaped article thus formed was heated for 10 hours in an oven maintained at a temperature of 120° C. and then allowed to cool. The baked article was found to be sufficiently flexible so that it was not easily shattered or broken. It was water- and fire-resistant.

I claim:

1. The method which includes: treating exfoliated vermiculite with an aqueous solution containing from 1 to 5 per cent of the weight of the vermiculite of a mixture of from 5 to 50 parts by weight of a water-soluble heat-setting resin and correspondingly from 95 to 50 parts of a cold-water-soluble cellulose ether; shaping the treated vermiculite in a mold; warming the said shaped composition in the mold to from 60° to 100° C. thereby to stiffen the said shape without substantial setting of the heat-setting resin; removing the said stiffened shape from the mold; drying the said removed shape; and baking the said dried shape at a temperature of from 90° to 150° C.

2. The method which includes: treating exfoliated vermiculite with an aqueous solution containing from 1 to 5 per cent of the weight of the vermiculite of a mixture of from 5 to 50 parts by weight of a water-soluble, heat-setting resin and correspondingly from 95 to 50 parts of methyl cellulose; shaping the treated vermiculite in a mold; warming the said shaped composition in the mold to from 60° to 100° C. thereby to stiffen the said shape without substantial setting of the heat-setting resin; removing the said stiffened shape from the mold; drying the said removed shape without substantial cooling thereof; and baking the said dried shape at a temperature of from 90° to 150° C.

3. The method which includes: treating exfoliated vermiculite with an aqueous solution containing from 1 to 5 per cent of the weight of the vermiculite of a mixture of from 10 to 20 parts by weight of a water-soluble heat-setting melamine-formaldehyde resin and correspondingly from 90 to 80 parts of methyl cellulose; shaping the treated vermiculite in a mold; warming the said shaped composition in the mold to from 60° to 100° C. thereby to stiffen the said shape without substantial setting of the heat-setting resin; removing the said stiffened shape from the mold; drying the removed shape without substantial cooling thereof; and baking the dried shape at a temperature of from 90° to 150° C.

4. The method which includes: treating exfoliated vermiculite with an aqueous solution containing from 1 to 5 per cent of the weight of the vermiculite of a mixture of from 10 to 20 parts by weight of a water-soluble, heat-setting urea-formaldehyde resin and correspondingly from 90 to 80 parts of methyl cellulose; shaping the treated vermiculite in a mold; warming the said shaped composition in the mold to from 60° to 100° C. thereby to stiffen the said shape; removing the said stiffened shape from the mold; drying the removed shape without substantial cooling thereof; and baking the dried shape at a temperature of from 90° to 150° C.

5. The method which includes: treating exfoliated vermiculite with an aqueous solution containing from 1 to 5 per cent of the weight of the vermiculite of a mixture of from 5 to 50 parts by weight of a water-soluble, heat-setting melamine-formaldehyde resin and correspondingly from 95 to 50 parts of a cold-water-soluble cellulose ether; shaping the treated vermiculite in a mold; warming the said shaped composition in the mold to from 60° to 100° C. thereby to stiffen the said shape without substantial setting of the heat-setting resin; removing the stiffened shape from the mold; drying the stiffened shape; and baking the dried shape at a temperature of from 90° to 150° C.

6. The method which includes: treating exfoliated vermiculite with an aqueous solution containing from 1 to 5 per cent of the weight of the vermiculite of a mixture of from 5 to 50 parts by weight of a water-soluble heat-setting urea-formaldehyde resin and correspondingly from 95 to 50 parts of a cold-water-soluble cellulose ether; shaping the treated vermiculite in a mold; warming the said shaped composition in the mold to from 60° to 100° C. thereby to stiffen the said shape without substantial setting of the heat-setting resin; removing the stiffened shape from the mold; drying the stiffened shape; and baking the dried shape at a temperature of from 90° to 150° C.

NORMAN R. PETERSON.